(12) United States Patent
Merandino

(10) Patent No.: US 12,422,374 B2
(45) Date of Patent: Sep. 23, 2025

(54) METHOD FOR MONITORING THE COMPLIANCE OF A CONTAINER AND APPARATUS THEREOF

(71) Applicant: Soffieria Bertolini S.P.A., Turin (IT)

(72) Inventor: Luca Merandino, None (IT)

(73) Assignee: Soffieria Bertolini S.P.A., Turin (IT)

( * ) Notice: Subject to any disclaimer, the term of this patent is extended or adjusted under 35 U.S.C. 154(b) by 106 days.

(21) Appl. No.: 18/261,930

(22) PCT Filed: Feb. 15, 2022

(86) PCT No.: PCT/IB2022/051307
§ 371 (c)(1),
(2) Date: Jul. 18, 2023

(87) PCT Pub. No.: WO2022/172250
PCT Pub. Date: Aug. 18, 2022

(65) Prior Publication Data
US 2024/0068953 A1 Feb. 29, 2024

(30) Foreign Application Priority Data
Feb. 15, 2021 (IT) .................. 102021000003293

(51) Int. Cl.
*G01N 21/90* (2006.01)
*G01N 21/88* (2006.01)

(52) U.S. Cl.
CPC . *G01N 21/9018* (2013.01); *G01N 2021/8816* (2013.01); *G01N 2021/8845* (2013.01)

(58) Field of Classification Search
CPC ........... G01N 21/9018; G01N 21/9072; G01N 21/9054; G01N 21/90; G01N 21/909;
(Continued)

(56) References Cited

U.S. PATENT DOCUMENTS 4,121,103 A * 10/1978 Calhoun ............. G01F 23/2921
250/339.05
4,650,326 A * 3/1987 Nagamine .......... G01N 21/9054
209/526
(Continued)

FOREIGN PATENT DOCUMENTS

EE 9800457 A * 8/1999
EP 2 005 146 B1 7/2009
(Continued)

OTHER PUBLICATIONS

International Search Report and Written Opinion dated Jun. 15, 2022, issued in PCT Application No. PCT/IB2022/051307, filed Feb. 15, 2022.
(Continued)

*Primary Examiner* — Tarifur R Chowdhury
(74) *Attorney, Agent, or Firm* — Workman Nydegger

(57) ABSTRACT

A method for monitoring the compliance of a container having a substantially cylindrical shape includes: rotating the container about its longitudinal axis; illuminating the rotating container with a first light source having a first wavelength, thereby generating a first image representative of any incohesive particles that may be present on an inner and/or outer surface of the container; illuminating the rotating container with a second light source having a second wavelength, thereby generating a second image representative of any defects on the surface of the container; acquiring the first image by means of a first acquisition device; acquiring the second image by means of a second acquisition device; comparing the first image and the second image with reference parameters, and notifying any defects of the container as a function of the comparison; wherein the first light source has a different wavelength than the second light source.

17 Claims, 2 Drawing Sheets

(58) Field of Classification Search
CPC ... G01N 2021/8845; G01N 2021/8832; G01N 33/0081; G01N 33/94; G01N 21/8803; G01N 21/958; G01N 21/314; G01N 21/88; G01N 2015/1493; G01N 2015/1433
USPC ..... 356/237.1–237.5, 239.4, 239.1, 223, 9.6, 356/240.1, 426–428; 250/223 B, 223 R, 250/233
See application file for complete search history.

(56) References Cited

U.S. PATENT DOCUMENTS

| | | | | |
|---|---|---|---|---|
| 5,536,935 | A * | 7/1996 | Klotzsch | G01N 21/9018 |
| | | | | 209/582 |
| 8,670,032 | B2 * | 3/2014 | Hermann | G01N 21/9036 |
| | | | | 348/125 |
| 10,337,977 | B1 * | 7/2019 | Kuhn | G01N 21/85 |
| 2017/0016833 | A1 * | 1/2017 | Huibregtse | G01N 21/9036 |
| 2020/0072736 | A1 | 3/2020 | Long et al. | |

FOREIGN PATENT DOCUMENTS

| | | | | |
|---|---|---|---|---|
| EP | 1988387 B1 * | 8/2015 | ......... | G01N 21/9054 |
| WO | WO-2018061196 A1 * | 4/2018 | ............. | G01N 21/90 |

OTHER PUBLICATIONS

International Preliminary Report on Patentability dated Aug. 15, 2023, issued in PCT Application No. PCT/IB2022/051307, filed Feb. 15, 2022.

* cited by examiner

METHOD FOR MONITORING THE COMPLIANCE OF A CONTAINER AND APPARATUS THEREOF

BACKGROUND OF THE INVENTION

1. The Field of the Invention

The present invention relates, in general, to a method for monitoring the compliance of a cylindrical container.

In particular, this specification will illustrate a method and an apparatus for monitoring the integrity and shape of substantially cylindrical containers. Such containers may be made of, for example, transparent glass or yellow glass, and may consist of, for example, vials, flacons, bottles, jars, etc., i.e., they may be suitable for containing, for example, liquids or powders like, for example, medicines, perfumes, oils, etc.

The invention can advantageously be used, for example, in a plant for the production of glass flacons adapted to contain, for example, medicines, in order to indicate and/or automatically discard any flacons affected by production flaws.

2. The Relevant Technology

Nowadays, it is common practice to perform tests on the shape of containers by means of, for example, suitable imaging systems that acquire an image of the cylindrical container and make a comparison with reference values in order to identify any non-compliant cylindrical containers.

For example, European patent no. EP2005146B1 describes a method for inspecting a glass container. Such method comprises:
  illuminating the container with light having a first wavelength, to produce a "bright-field" image; and
  illuminating the container with light having a second wavelength, to produce a "dark-field" image.

The bright-field image and the dark-field image are acquired using a single image acquisition device, and permit identifying any shape defects or fractures on the container.

The Applicant observed that glass particles may be present in the glass container which are not attached to the surface thereof. Disadvantageously, such not attached glass particles may, once the container has been filled (e.g., with a medicine), remain suspended within the container.

The Applicant noticed that checking the integrity and shape of the containers and verifying the absence of incohesive particles within the containers are time-consuming tasks that affect the container production costs.

SUMMARY OF THE INVENTION

It is an object of the present invention to provide a method and an apparatus for monitoring the integrity and shape of substantially cylindrical containers, which offer a solution to the above-mentioned problems.

The invention described herein consists of a method for monitoring the compliance of a container, said container having a substantially cylindrical shape, said method comprising:
  rotating said container about its longitudinal axis;
  illuminating said rotating container with a first light source having a first wavelength, thereby generating a first image representative of any incohesive particles that may be present on an inner and/or outer surface of said container;
  illuminating said rotating container with a second light source having a second wavelength, thereby generating a second image representative of any defects on the surface of said container;
  acquiring said first image by means of a first acquisition device;
  acquiring said second image by means of a second acquisition device;
  comparing said first image and said second image with reference parameters;
  notifying any defects of said container as a function of said comparison;
  wherein said first light source has a different wavelength than said second light source.

According to a further aspect, the present invention provides an apparatus for monitoring the compliance of a substantially cylindrical container, comprising:
  a support equipped with a plurality of rollers adapted to rotate said container about the longitudinal axis of said container;
  a first light source having a first wavelength and adapted to illuminate said container;
  a second light source having a second wavelength and adapted to illuminate said container;
  a first acquisition device configured for acquiring an image representative of any incohesive particles that may be present on an inner and/or outer surface of said rotating container;
  a second acquisition device configured for acquiring an image representative of any defects on the surface of said rotating container;
  wherein said first light source has a different wavelength than said second light source.

Further advantageous features of the present invention are set out in the appended claims, which are an integral part of the present description.

BRIEF DESCRIPTION OF THE DRAWINGS

The invention will now be described in detail through some non-limiting exemplary embodiments thereof, with particular reference to the annexed drawings, wherein.

Figure 1:
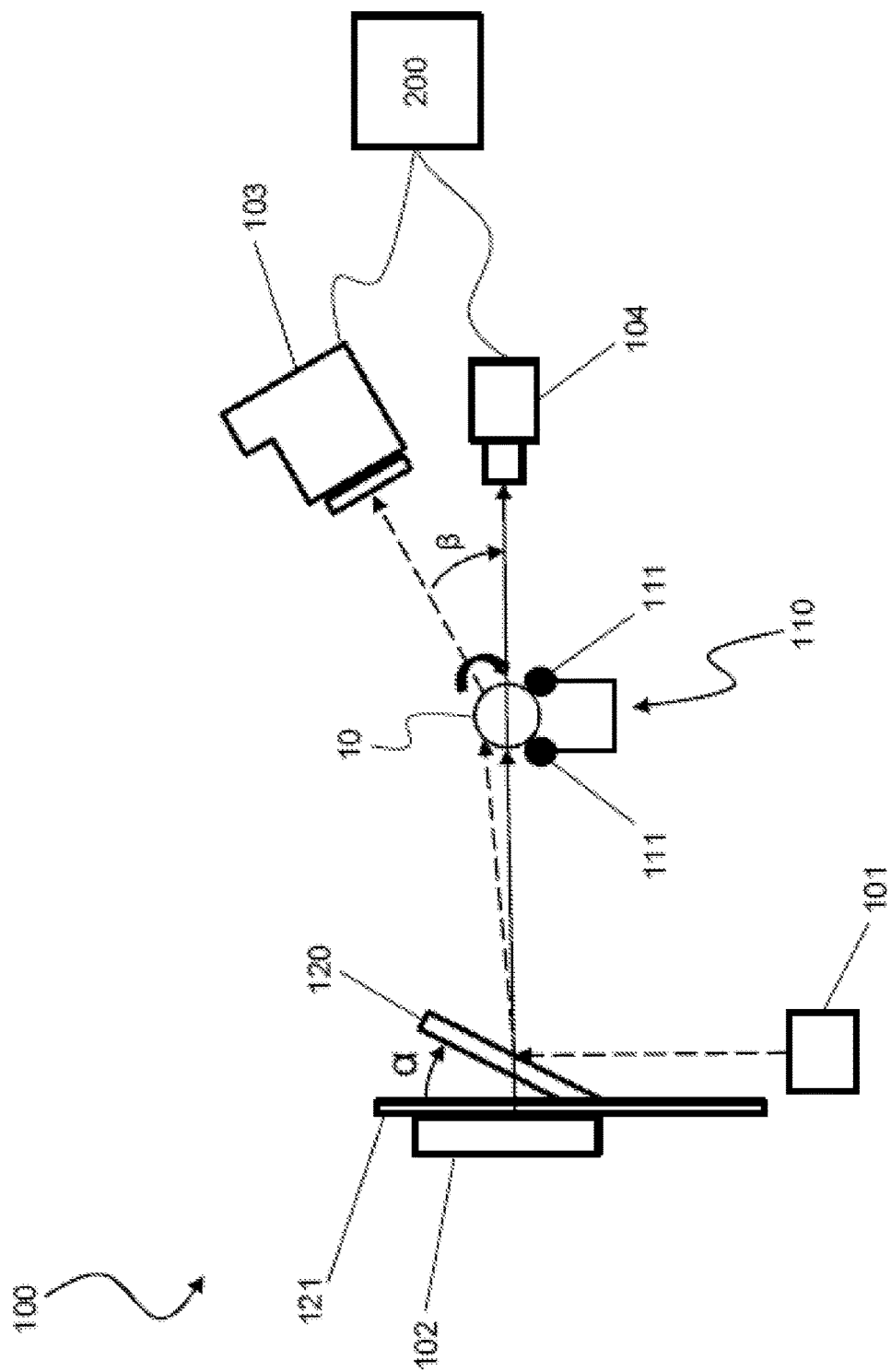
FIG. 1 schematically shows a monitoring apparatus according to one embodiment of the present invention.

With initial reference to FIG. 1, an apparatus for monitoring the compliance of one or more containers 10 is designated as a whole by reference numeral 100.

DETAILED DESCRIPTION OF THE PREFERRED EMBODIMENTS

In the following, the expression "monitoring the compliance" refers to checking the presence or absence of scratches, inclusions, spots, fractures (also superficial ones) on the inner or outer surface of a container 10, as well as the presence or absence of glass particles not attached to the walls of the container 10.

Preferably, such containers 10 have a substantially cylindrical shape. For example, such containers 10 may be vials, flacons, bottles or jars made of glass. In particular, such containers 10 are flacons having a cylindrical body and a substantially longitudinal extension. Preferably, such cylindrical body is provided, at a first end thereof, with a flange and, at a second end thereof, with a bottom.

Said apparatus 100 comprises a support 110 for the container 10.

Said support 110 is equipped with a plurality of rollers 111 adapted to rotate the container 10 about the longitudinal axis of the container 10 itself.

For example, as shown in FIG. 1, the support 110 is equipped with a pair of rollers 111 arranged parallel to each other and driven by an electric motor (not shown in the drawing). Note that such pair of rollers 111 defines a support for the container 10. Preferably, the container 10 is positioned on the pair of rollers 111 in such a way that the longitudinal axis of the container 10 is parallel to the axis of longitudinal development of each roller 111.

Preferably, said apparatus 100 comprises a robotic arm (not shown). Such robotic arm is preferably configured for picking up a container 10—e.g., from a box or a conveyor belt—and for positioning it on the support 110. For example, said robotic arm is configured for picking up a container 10 from a conveyor belt and for positioning the container 10 on the pair of rollers 111.

Preferably, the support 110 comprises an abutment wall and a piston. In particular, when said piston is operated, it pushes the container 10 against the abutment wall, thus positioning it correctly on the rollers 111.

According to the present invention, said apparatus 100 comprises:
  a first light source 101 having a first wavelength. Said first light source 101 is adapted to illuminate said container 10 evenly when the latter has been positioned on the support 110;
  a second light source 102 having a second wavelength. Said second light source 102 is adapted to illuminate the container 10 evenly on the support 110.

According to the present invention, the first light source 101 has a different wavelength than the second light source 102.

Preferably, the first light source 101 and the second light source 102 illuminate the container 10 alternately.

As an alternative, the first light source 101 and the second light source 102 illuminate the container 10 simultaneously.

Preferably, the first light source 101 is a visible-light illuminator. For example, the first light source 101 is an illuminator having a wavelength ranging from 450 nm to 740 nm. For example, the first light source 101 is a source of orange light (i.e., light having a wavelength of 550 nm).

Preferably, the second light source 102 is an infrared-light illuminator.

Preferably, the apparatus 100 comprises a dichroic mirror 120. For example, said dichroic mirror 120 is a so-called "cold mirror".

Dichroic mirrors and cold mirrors are known and will not be described in detail herein.

For example, as visible in FIG. 1, the second light source 102 is arranged behind the cold mirror 120. The position of the first light source 101 is such that the light is emitted perpendicular to the light emitted from the second light source 102.

Note that the light emitted from the first light source 101 is incident on the surface of the dichroic mirror 120 and is reflected towards the container 10, thus illuminating it. The light emitted from the second light source 102 is transmitted through the dichroic mirror 120 and illuminates the container 10.

Preferably, the dichroic mirror 120 is mounted on a mirror support 121. Preferably, such mirror support 121 is arranged vertically and permits changing the angle of the dichroic mirror 120 relative to the vertical plane of such support.

Preferably, the dichroic mirror 120 is mounted on the mirror support 121 with an angle α of 40° to 50°. Even more preferably, the dichroic mirror 120 is mounted on the mirror support 121 with an angle α of 45°.

The apparatus 100 comprises:
  a first acquisition device 103 configured for acquiring a first image of the container 10, generated by means of the light emitted by the first light source 101;
  a second acquisition device 104 configured for acquiring a second image of the container 10, generated by means of the light emitted by the second light source 102.

According to the present invention, the first image and the second image are acquired by means of the respective acquisition means 103, 104 during the rotation of the container 10.

Preferably, the first acquisition device 103 is a matrix-type camera.

Preferably, the second acquisition device 104 is a linear camera.

In particular, preferably, the linear camera 104 is so positioned that the axis of the linear camera 104 is parallel to the longitudinal axis of the container 10.

Note that "axis of the liner camera" refers to the axis of longitudinal extension of the optical sensor of the linear camera.

Preferably, the axis of the linear camera 104, the longitudinal axis of the container 10—when in position on the support 110—and the center of the second light source 102 all lie in the same plane.

Preferably, the matrix-type camera 103 is positioned at an angle β of 10° to 20° relative to the plane in which the axis of the linear camera 104 and the longitudinal axis of the container 10 lie.

Note that said first image, acquired as described above, is representative of any incohesive particles that may be present on an inner and/or outer surface of the container 10. In particular, such glass particles are easily discernable from the container 10. More in particular, in said first image the container 10 has a "dark" colour, whereas any incohesive glass particles will be "bright", e.g., due to visible-light refraction phenomena.

Note that said second image, acquired as described above, is representative of any defects that may be present on the surface of the container 10. In particular, the conformation and/or uniformity of the surface of the container 10 can be checked as the container 10 rotates.

Preferably, the apparatus 100 comprises a computer 200.

The computer 200 is configured for receiving the first image (representative of any incohesive particles that may be present on an inner and/or outer surface of the container 10) and the second image (representative of any defects on the surface of the container 10), and for comparing them with pre-set parameters that make it possible to determine if the container 10 is a compliant container.

The computer 200 is preferably configured for processing said first image, calculating one or more of the following parameters:
  total length of the main body of the container 10;
  perpendicularity of the bottom relative to the main body of the container 10;
  bottom-body fillet radius;
  perpendicularity of the flange relative to the main body of the container 10;
  coaxiality of the flange relative to the longitudinal axis of the main body of the container 10.

The present invention also provides a method for monitoring the compliance of a container 10. Preferably, as aforementioned, said container 10 has a substantially cylindrical shape.

Figure 2:
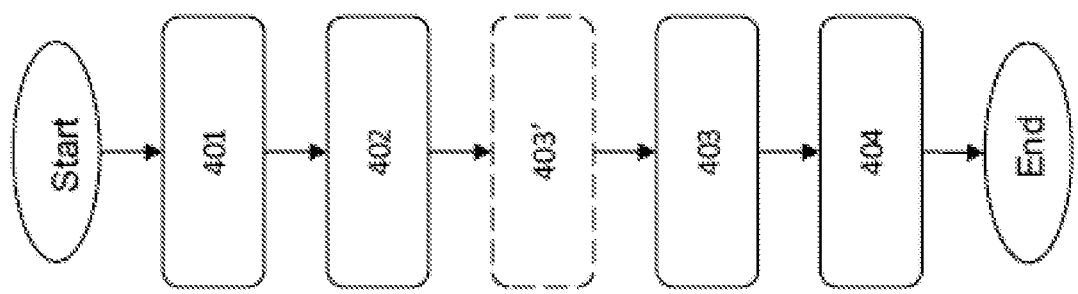
FIG. 2 is a flow chart of a method according to the present invention.

With reference to FIG. 2, according to the present invention the method comprises starting a step of rotating and illuminating 401 the container 10, wherein the container 10 is rotated about its longitudinal axis and is illuminated with:
- a first light source 101 having a first wavelength, thereby generating a first image representative of any incohesive particles that may be present on an inner and/or outer surface of said container 10; and
- a second light source 102 having a second wavelength, thereby generating a second image representative of any defects on the surface of the container 10.

Preferably, the first light source 101 and the second light source 102 illuminate the container 10 alternately. In other words, the first light source 101 and the second light source 102 illuminate the container 10 at different times.

As an alternative, the illumination by means of said first light source 101 and said second light source 102 occurs simultaneously.

The method according to the invention further comprises starting an image acquisition step 402, wherein said first image is acquired by means of a first acquisition device 103 and said second image is acquired by means of a second acquisition device 104.

At the end of the image acquisition step 402, starting a comparison step 403, wherein the first image and the second image are compared with pre-set reference parameters.

At the end of said comparison step 403, starting a notification step 404, wherein any defects of the container 10 are notified as a function of the previous comparison step 403.

Preferably, prior to the comparison step 403, the computer 200 starts an image processing step 403', wherein one or more of the following parameters are calculated:
- total length of the main body of the container 10;
- perpendicularity of the bottom relative to the main body of the container 10;
- bottom-body fillet radius;
- perpendicularity of the flange relative to the main body of the container 10;
- coaxiality of the flange relative to the longitudinal axis of the main body of the container 10;
- as a function of the first image acquired by means of the first acquisition device 103.

The advantages of the present invention are apparent from the above description.

The method and the apparatus 100—for monitoring the compliance of a container 10 having a substantially cylindrical shape—advantageously allow detecting the presence of any imperfections, damages, fractures as well as the presence of any glass powder grains not attached to the container 10.

A further advantage of the present invention lies in the fact that it provides a method for monitoring the compliance of a container 10 which makes it possible to reduce the time required for the inspections while at the same time permitting the execution of all necessary verifications.

Of course, without prejudice to the principle of the present invention, the forms of embodiment and the implementation details may be extensively varied from those described and illustrated herein merely by way of non-limiting example, without however departing from the protection scope of the present invention as set out in the appended claims.

The invention claimed is:

1. A method for monitoring the compliance of a container, said container having a substantially cylindrical shape, said method comprising:
   rotating said container about its longitudinal axis;
   illuminating said rotating container with a first light source having a first wavelength;
   acquiring, by means of a first acquisition device, a first image representative of any incohesive particles present on an inner and/or outer surface of said container;
   illuminating said rotating container with a second light source having a second wavelength;
   acquiring, by means of a second acquisition device, a second image representative of any defects on the surface of said container;
   comparing said first image and said second image with reference parameters of said container;
   notifying any defects of said container as a function of said comparison,
   wherein said first light source has a different wavelength than said second light source;
   wherein a dichroic mirror, mounted on a mirror support, is arranged so that said second light source is positioned behind said mirror support and emits a second light through said dichroic mirror for illuminating said rotating container, and
   wherein said first light source is positioned so to emit a first light incident on a surface of said dichroic mirror for illuminating said rotating container and is emitted perpendicularly to said second light.

2. The method according to claim 1, wherein said first light source and said second light source illuminate the container alternately.

3. The method according to claim 1, wherein said first light source and said second light source illuminate said container simultaneously.

4. The method according to claim 1, wherein said first light source is a visible-light illuminator with a wavelength ranging from 450 nm to 740 nm.

5. The method according to claim 1, wherein said second light source is an infrared-light illuminator.

6. The method according to claim 1, wherein said first acquisition device is a matrix-type camera.

7. The method according to claim 1, wherein said second acquisition device is a linear camera.

8. The method according to claim 1, wherein said container is a flacon, said flacon comprising a cylindrical main body having a substantially longitudinal extension, said cylindrical main body being provided, at a first end thereof, with a flange and, at a second end thereof, with a bottom, wherein after acquiring the first image and the second image but prior to comparing the first image and the second image, said method further comprises:
   processing said first image acquired by said first acquisition device, calculating one or more of the following parameters:
   total length of said main body;
   perpendicularity of said bottom relative to said main body;
   bottom-body fillet radius;
   perpendicularity of said flange relative to said main body;
   coaxiality of said flange relative to a longitudinal axis of said main body.

9. The method according to claim 1, wherein said mirror support is vertically arranged and permits changing an angle of said dichroic mirror relative to a vertical plane of said mirror support.

10. The method according to claim 9, wherein said dichroic mirror is mounted on said mirror support with the angle of the dichroic mirror being in a range between 40° to 50°.

11. The method according to claim 1, wherein the second light source and the second acquisition device are on opposing sides of the container with the second light source, the second acquisition device, and the container being in axial alignment.

12. An apparatus for monitoring the compliance of a substantially cylindrical container, comprising:
 a support equipped with a plurality of rollers adapted to rotate said container about the longitudinal axis of said container;
 a first light source having a first wavelength and adapted to illuminate said container;
 a second light source having a second wavelength and adapted to illuminate said container;
 a first acquisition device configured for acquiring an image representative of any incohesive particles present on an inner and/or outer surface of said rotating container;
 a second acquisition device configured for acquiring an image representative of any defects on the surface of said rotating container,
 a computer for comparing said first image and said second image with reference parameters of said container and for notifying any defects of said container as a function of said comparison,
 wherein said first light source has a different wavelength than said second light source,
 wherein said apparatus comprises a dichroic mirror, mounted on a mirror support,
 wherein said second light source is positioned behind said mirror support to emit a second light through said dichroic mirror for illuminating said container,
 and wherein said first light source is positioned to emit a first light for illuminating said container, the first light being emitted to be incident on a surface of said dichroic mirror and perpendicularly to said second light.

13. The apparatus according to claim 12, wherein said mirror support is vertically arranged and permits changing an angle of said dichroic mirror relative to a vertical plane of said mirror support.

14. The apparatus according to claim 13, wherein said dichroic mirror is mounted on said mirror support with the angle of the dichroic mirror being in a range between 40° to 50°.

15. The apparatus according to claim 12, wherein said first light source is a visible-light illuminator having a wavelength ranging from 450 nm to 740 nm.

16. The apparatus according to claim 12, wherein said second light source is an infrared-light illuminator.

17. The apparatus according to claim 12, wherein the second light source and the second acquisition device are on opposing sides of the container with the second light source, the second acquisition device, and the container being in axial alignment.

* * * * *